Sept. 30, 1947.   W. L. DAWSON   2,428,148
WHEEL SUSPENSION FOR VEHICLES
Filed June 10, 1944
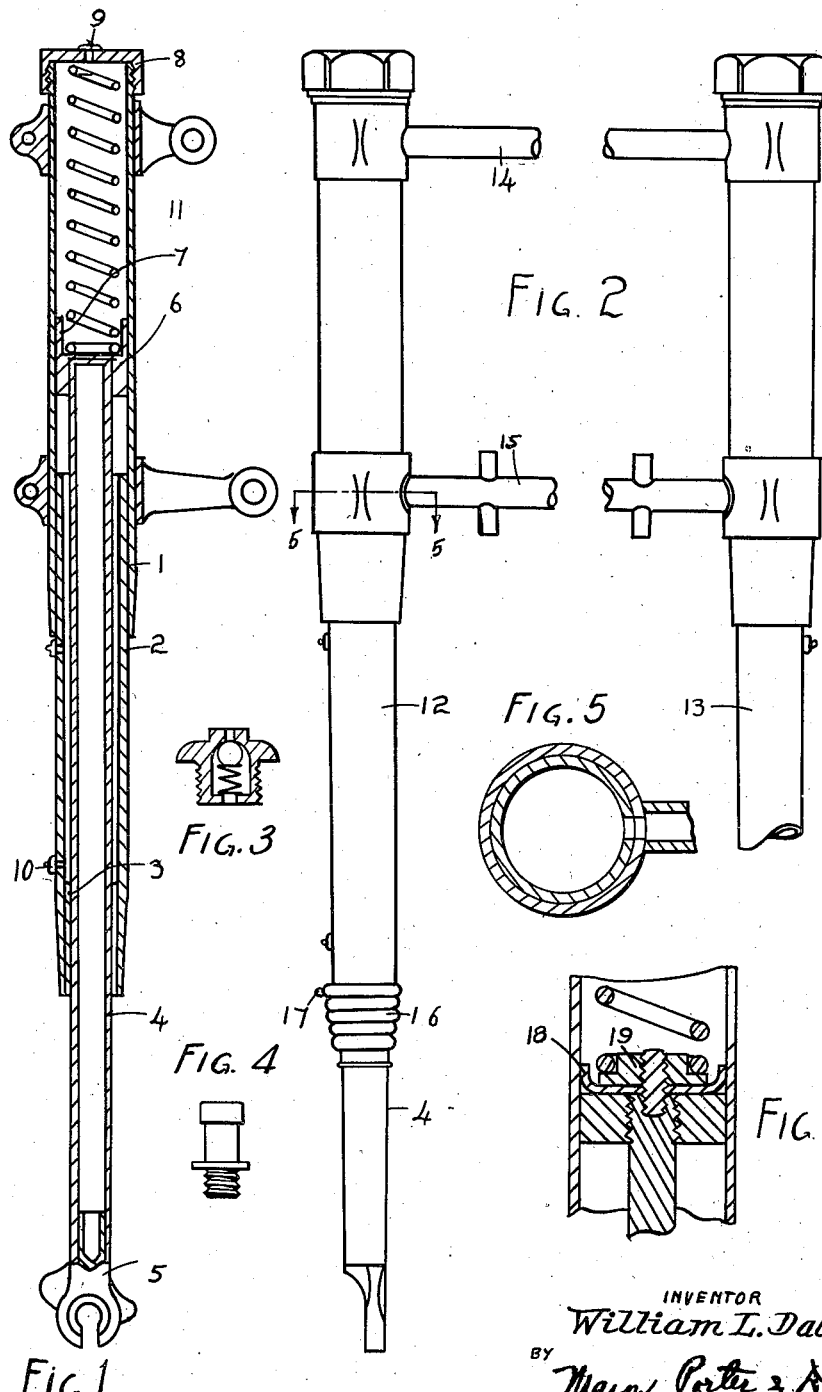
INVENTOR
William L. Dawson
BY
Mann, Porter & Miller
ATTORNEYS Patented Sept. 30, 1947

2,428,148

UNITED STATES PATENT OFFICE 2,428,148

WHEEL SUSPENSION FOR VEHICLES

William Leslie Dawson, Lichfield, England, assignor of one-half to Jack Frodsham, Los Angeles, Calif.

Application June 10, 1944, Serial No. 539,739
In Great Britain May 6, 1943

1 Claim. (Cl. 280—276)

The present invention relates to improvements in elastic suspensions for application to bicycles, motor-bicycles and the like.

One object is to provide a more robust and durable suspension which is less liable to fracture during hard usage.

Another object is to inhibit wheel wobble in a vehicle suspension.

A further object is the provision of a support comprising one or more pairs of telescopic members having means for balancing the forces acting upon each member of the pair or pairs.

One form of construction showing the application of the invention to a front fork suspension of a bicycle or motor-bicycle is shown in the accompanying drawings, in which:

Fig. 1 is a side elevation, partly in section,

Fig. 2 is an outside elevation.

Fig. 3 is a section, on an enlarged scale, of one form of non-return valve.

Fig. 4 is an elevation of an alternative form of non-return valve, adapted for connection to an air supply.

Fig. 5 is a section on the line 5—5 of Fig. 2.

Fig. 6 is a section, partly broken away, of an alternative type of piston.

The arrangement comprises a cylinder formed of either a single tube or a pair of tubes 1, 2, brazed or screwed, welded or otherwise connected together, the lower end of which is provided with a bearing 3 in which can telescope a second element consisting of a tube 4 forming a piston, the lower end of which may be provided with a usual split fork 5 for receiving a wheel axle. The upper end of the element 4 is provided with a piston 6, which preferably has a flexible lip 7, or again may be provided with the usual cap of leather or the like flexible material.

An air chamber is formed on either side of this piston 6, in that the top end of the cylinder 1 is closed by a cap 8 provided with a non-return valve 9, whilst the lower end of the cylinder 2 is also provided with a non-return valve 10. These non-return valves as shown in Fig. 3 may also be used for inserting lubricant into the device.

In the arrangement shown, a compression spring 11 is disposed on one side of the piston between this and the cap 8. It will be obvious that a similar compression spring may also be disposed on the opposite side of the piston.

Where the device is to be used as an elastic fork suspension, as shown in Fig. 2, it will be preferred that the air spaces on either side of the pistons 6 in the two elements 12, 13, forming the fork are interconnected, for instance by arranging the usual cross-bars 14, 15, to be hollow and communicate with the spaces above and below the piston 6 respectively, as shown in Fig. 5.

Leather bellows or the like 16 may be provided between the end of the cylinders and the piston elements 4 to prevent the ingress of dust or dirt causing wear of the rubbing surfaces. Such flexible bellows may be provided with a non-return valve 17 serving for the passing of lubricant into the interior of this shield or bellows.

The usual attachment for mudguards or brakes may be applied to the elements 2 and 4 respectively.

The non-return valves 9 or 10 may be formed as shown in Fig. 4 of the type frequently used on vehicle tyres, so that a pump can be attached whereby air under pressure can be fed to the spaces above or below the piston, or both, as desired.

Alternatively the piston may be constructed with a cup-leather 18 retained by a circlip or spring 19, Fig. 6.

The term "motorcycle" used in the following claim is intended to include a motorbicycle or a bicycle.

I declare that what I claim is:

A front fork for a motorcycle comprising a pair of telescopic elements, one element of each pair acting as a piston and the other as a co-operating cylinder having an upper end and a lower end; a non-return valve adjacent each end of each of said cylinders; two sleeves surrounding and fixed to each cylinder near said upper end and near said lower end thereof respectively; two hollow rigid cross-bars each having opposite ends fixed respectively to corresponding sleeves of the cylinder, so as to form a rigid framework whereby the cylinders are held in substantially mutually parallel relationship, there being formed passageways in said sleeves and portions of the cylinders adjacent thereto whereby, for pressure equalisation purposes, a corresponding part of the interior of one cylinder finds communication with a corresponding part of the interior of the other cylinder by way of appropriate passageways and one of said cross-bars.

WILLIAM LESLIE DAWSON.

REFERENCES CITED

The following references are of record in the file of this patent:

UNITED STATES PATENTS

| Number | Name | Date |
|---|---|---|
| 1,692,593 | Szabo | Nov. 20, 1928 |
| 835,247 | Morgan | Nov. 6, 1906 |
| 1,105,953 | Bates | Aug. 4, 1914 |
| 1,351,843 | Dunn | Sept. 7, 1920 |
| 1,597,074 | Keller | Aug. 24, 1926 |
| 1,639,369 | Cormier | Aug. 16, 1927 |
| 2,224,305 | Krueger | Dec. 10, 1940 |

FOREIGN PATENTS

| Number | Country | Date |
|---|---|---|
| 822,512 | France | Sept. 20, 1937 |